United States Patent
Lei et al.

(10) Patent No.: US 9,288,823 B2
(45) Date of Patent: Mar. 15, 2016

(54) HARQ TIMING SCHEME FOR SINGLE-CARRIER UPLINK CONTROL INFORMATION WITH INTER-SITE CARRIER AGGREGATION

(75) Inventors: Haipeng Lei, Beijing (CN); Kodo Shu, Beijing (CN)

(73) Assignee: Nokia Technologies Oy, Espoo (FI)

(*) Notice: Subject to any disclaimer, the term of this patent is extended or adjusted under 35 U.S.C. 154(b) by 115 days.

(21) Appl. No.: 14/235,265

(22) PCT Filed: Aug. 31, 2011

(86) PCT No.: PCT/CN2011/079168
§ 371 (c)(1),
(2), (4) Date: Jan. 27, 2014

(87) PCT Pub. No.: WO2013/029251
PCT Pub. Date: Mar. 7, 2013

(65) Prior Publication Data
US 2014/0153535 A1      Jun. 5, 2014

(51) Int. Cl.
*H04W 74/04*  (2009.01)
*H04W 72/12*  (2009.01)
*H04L 1/18*   (2006.01)
*H04L 5/00*   (2006.01)

(52) U.S. Cl.
CPC ............. *H04W 74/04* (2013.01); *H04L 1/1861* (2013.01); *H04L 5/001* (2013.01); *H04L 5/0055* (2013.01); *H04L 5/0073* (2013.01); *H04W 72/12* (2013.01)

(58) Field of Classification Search
None
See application file for complete search history.

(56) References Cited

U.S. PATENT DOCUMENTS

| | | | |
|---|---|---|---|
| 2011/0013536 A1* | 1/2011 | Falahati et al. | 370/252 |
| 2011/0310753 A1* | 12/2011 | Chou et al. | 370/252 |
| 2012/0122472 A1* | 5/2012 | Krishnamurthy et al. | 455/456.1 |

(Continued)

FOREIGN PATENT DOCUMENTS

| | | |
|---|---|---|
| CN | 102098739 A | 6/2011 |
| CN | 102136863 A | 7/2011 |
| WO | 2011047196 A1 | 4/2011 |

OTHER PUBLICATIONS

"3rd Generation Partnership Project;Technical Specification Group Radio Access Network; Evolved Universal Terrestrial Radio Access (E-UTRA); Physical layer procedures (Release 10)", 3GPP TS 36.213, V10.2.0, Jun. 2011, pp. 1-120.

(Continued)

*Primary Examiner* — Kodzovi Acolatse
(74) *Attorney, Agent, or Firm* — Harrington & Smith

(57) ABSTRACT

There is a pattern for downlink almost blank sub frames ABSFs for a first network node (e.g., macro eNB) operating in a first component carrier (e.g., PCell). For a user equipment UE operating with the first network node on the first component carrier and also with a second network node on the second component carrier, then either or both of the following are imposed. The UE is scheduled on the first component carrier such that no uplink control information UCI from the UE is scheduled for any uplink subframe in the first component carrier which maps from any of the ABSFs; and the UE is scheduled on the second component carrier such that UCI from the UE is scheduled only for an uplink subframe in the second component carrier which maps from any of the ABSFs. By example, the UCI includes either/or ACKs and NACKs corresponding to data sent downlink to the UE.

16 Claims, 5 Drawing Sheets

(56) References Cited

U.S. PATENT DOCUMENTS

2013/0045770 A1* 2/2013 Aschan et al. ................ 455/522
2014/0112180 A1* 4/2014 Axmon et al. ................ 370/252

OTHER PUBLICATIONS

Extended European Search Report received for corresponding European Patent Application No. 11871572.1, dated Mar. 16, 2015, 8 pages.

"On Resource Partitioning Between Macro and HeNBs", 3GPP TSG-RAN WG4 Meeting #56, R4-102978, Agenda item: 8.12.1, Nokia Corporation, Aug. 23-27, 2010, 9 pages.

"On X2 Signaling for TDM eICIC in Macro+Pico Scenarios", 3GPP TSG RAN WG3 #70 Meeting, R3-103555, Agenda item: 19.1, Nokia Siemens Networks, Nov. 15-19, 2010, 4 pages.

"Inter-Frequency eICIC Enhancements for Rel 11.0", 3GPP TSG-RAN2#75 meeting, R2-114036, Agenda Item: 7.5, Samsung, Aug. 22-26, 2011, pp. 1-4.

"Potential for Uplink Capacity Enhancement When Applying TDM EICIC", 3GPP TSG RAN WG1 #66 Meeting, R1-112383, Agenda item: 6.3.2, Nokia Siemens Networks, Aug. 22-26, 2011, 2 pages.

International Search Report and Written Opinion received for corresponding Patent Cooperation Treaty Application No. PPCT/CN2011/079168, dated May 31, 2012, 10 pages.

* cited by examiner

US 9,288,823 B2

HARQ TIMING SCHEME FOR SINGLE-CARRIER UPLINK CONTROL INFORMATION WITH INTER-SITE CARRIER AGGREGATION

RELATED APPLICATION

This application was originally filed as Patent Cooperation Treaty Application No. PCT/CN2011/079168 filed Aug. 31, 2011.

TECHNICAL FIELD

This invention relates generally to signaling in radio networks having two or more cells communicating with a user equipment such as in a carrier aggregation arrangement, and more specifically relates to control signaling related to radio resource scheduling and acknowledgements/negative acknowledgments.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

- 3GPP third generation partnership project
- ABSF almost blank subframe
- ACK acknowledgment
- BLER block error ratio or rate
- DL downlink (network towards UE)
- eNB EUTRAN Node B (also eNodeB)
- EUTRAN evolved UTRAN (also known as LTE or LTE-A)
- HARQ hybrid automatic repeat request
- LTE/-A long term evolution/long term evolution-advanced
- MME mobility management entity
- NACK negative acknowledgment
- Node B base station
- PCell primary cell/primary component carrier
- PDCCH physical downlink control channel
- PDSCH physical downlink shared channel
- PHICH physical HARQ indicator channel
- PUCCH physical uplink control channel
- PUSCH physical uplink shared channel
- RF radio frequency
- RRC radio resource signaling
- SCell secondary cell/secondary component carrier
- UCI uplink control information
- UE user equipment
- UL uplink (UE towards network)
- UTRAN universal terrestrial radio access network The LTE system is to provide significantly enhanced services by means of higher data rates and lower latency with reduced cost. In the LTE and other cellular radio systems the base station (termed an eNodeB or eNB in LTE) signals on the PDCCH the time-frequency resources (physical resource blocks) on the PDSCH and PUSCH which are allocated to a mobile terminal (UE). This scheduling technique allows advanced multi-antenna techniques like precoded transmission and multiple-input/multiple-output operation for the downlink shared data channel.

LTE is a heterogeneous network (sometimes termed Het-Net), in which there are access nodes apart from the traditional base stations which operate at different power levels. For example, there may be privately operated nodes sometimes termed pico or femto nodes to which the conventional (macro) eNBs can offload traffic; there may be remote radio heads or repeaters to fill coverage holes, and there may be relay nodes which operate similar to the eNB which controls them but using a subset of the eNB's radio resources assigned to the relay node by the parent eNB.

LTE-A (expected in 3GPP Release 11) implements heterogeneous networks using carrier aggregation, where two or more component carriers spanning different frequency bands are aggregated into the same system. By example, there may be five component carriers which together cover the whole system bandwidth of 100 MHz and a given UE has two of those component carriers as active for itself. Each UE always has one PCell and may have one or more SCells, which may be in the licensed spectrum or in unlicensed spectrum such as the Industrial, Scientific and Medical (ISM) band. Any given SCell may have a full set of data and control channels (e.g., backwards compatible with 3GPP Release 8) or may carry only data channels (termed an extension carrier).

In a LTE-A heterogeneous network the same UE may be communicating with a macro eNB 14 on the PCell and with a pico eNB 12 on its SCell as shown at FIG. 1. For such an inter-site implementation of carrier aggregation, multiple component carriers are transmitted from multiple sites in the downlink and multiple component carriers are transmitted to multiple sites in uplink. Inter-site carrier aggregation can provide dynamic multilayer traffic steering or offloading, enhance data rate in the overlapped coverage region of two/ multiple cells or transmission points, and reduce handover overhead. Such a Macro-Pico usage is expected to be the most typical scenario when a UE is configured with two (or more) component carriers.

In case of inter-site carrier aggregation, the UE needs to transmit the UCI that is relevant to the PCell and to the SCell, for example to report the periodic channel state information of each cell, to feedback the ACKs/NACKs relating to the scheduled resources on the PDSCH of the PCell and on the PDSCH of the SCell, and to send scheduling requests. If the UE simultaneously transmits uplink control information on both carriers in the uplink (referred to as a dual-carrier UCI transmission) it may lead to high BLER of the transmitted UCI because of the UE's power limitations and also due to a large pathloss from the UE to the macro eNB. This makes it difficult to meet the guaranteed target BLER of 1% for ACK-to-NACK and of 0.1% for NACK-to-ACK transmissions.

Exemplary embodiments disclosed below are directed toward control signaling which enables the network and UE to meet the above (or other) BLER targets, particularly in a single-carrier UCI transmission scenario.

SUMMARY

Figure 1:
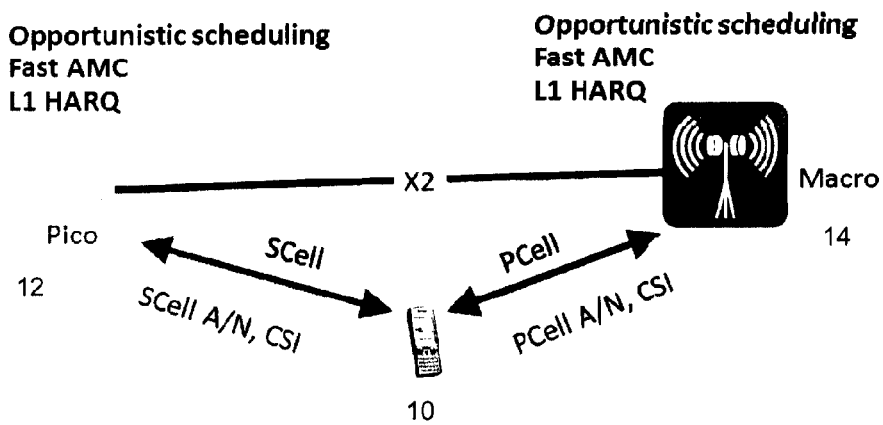
FIG. 1 is a block diagram illustrating one exemplary radio environment and the relevant logical channels for implementing the invention in an LTE radio system.

In a first exemplary aspect of the invention there is an apparatus which includes at least one processor and at least one memory including computer program code. The at least one memory and the computer program code are configured, with the at least one processor, to cause the apparatus to at least: determine a pattern for downlink almost blank subframes for a first network node operating in a first component carrier; and for a user equipment operating with the first network node on the first component carrier and also with a second network node on the second component carrier, at least one of: scheduling the user equipment on the first component carrier such that no uplink control information from the user equipment is scheduled for any uplink subframe in the first component carrier which maps from any of the almost blank subframes; and scheduling the user equipment on the second component carrier such that uplink control information from the user equipment is scheduled only for an uplink subframe in the second component carrier which maps from any of the almost blank subframes.

In a second exemplary aspect of the invention there is a method comprising: determining a pattern for downlink almost blank subframes for a first network node operating in a first component carrier. Further in the method, for a user equipment operating with the first network node on the first component carrier and also with a second network node on the second component carrier, at least one of: scheduling the user equipment on the first component carrier such that no uplink control information from the user equipment is scheduled for any uplink subframe in the first component carrier which maps from any of the almost blank subframes; and scheduling the user equipment on the second component carrier such that uplink control information from the user equipment is scheduled only for an uplink subframe in the second component carrier which maps from any of the almost blank subframes.

In a third exemplary aspect of the invention there is a computer program product comprising a computer-readable medium bearing computer program code embodied therein for use with a computer. In this aspect the computer program code comprises: code for determining a pattern for downlink almost blank subframes for a first network node operating in a first component carrier; and for a user equipment operating with the first network node on the first component carrier and also with a second network node on the second component carrier, at least one of: code for scheduling the user equipment on the first component carrier such that no uplink control information from the user equipment is scheduled for any uplink subframe in the first component carrier which maps from any of the almost blank subframes; and code for scheduling the user equipment on the second component carrier such that uplink control information from the user equipment is scheduled only for an uplink subframe in the second component carrier which maps from any of the almost blank subframes.

In a fourth exemplary aspect of the invention there is an apparatus comprising at least one processor and at least one memory containing computer program code. The at least one memory and the computer program code are configured, with the at least one processor, to cause the apparatus to at least: establish communications with a first network node on a first component carrier and also with a second network node on a second component carrier; receive scheduling from the first network node on the first component carrier and map uplink control information therefrom such that no uplink control information is scheduled for any uplink subframe in the first component carrier which maps from any of the almost blank subframes of the first network node on the first component carrier; and receive scheduling from the second network node on the second component carrier and map uplink control information therefrom such that uplink control information is scheduled only for an uplink subframe in the second component carrier which maps from any of the almost blank subframes on the first component carrier.

In a fifth exemplary aspect of the invention there is a method comprising: establishing communications with a first network node on a first component carrier and also with a second network node on a second component carrier; receiving scheduling from the first network node on the first component carrier and mapping uplink control information therefrom such that no uplink control information is scheduled for any uplink subframe in the first component carrier which maps from any of the almost blank subframes of the first network node on the first component carrier; and receiving scheduling from the second network node on the second component carrier and mapping uplink control information therefrom such that uplink control information is scheduled only for an uplink subframe in the second component carrier which maps from any of the almost blank subframes on the first component carrier.

In a sixth exemplary aspect of the invention there is a computer program product comprising a computer-readable medium bearing computer program code embodied therein for use with a computer. In this sixth aspect the computer program code comprises: code for establishing communications with a first network node on a first component carrier and also with a second network node on a second component carrier; code for receiving scheduling from the first network node on the first component carrier and mapping uplink control information therefrom such that no uplink control information is scheduled for any uplink subframe in the first component carrier which maps from any of the almost blank subframes of the first network node on the first component carrier; and code for receiving scheduling from the second network node on the second component carrier and mapping uplink control information therefrom such that uplink control information is scheduled only for an uplink subframe in the second component carrier which maps from any of the almost blank subframes on the first component carrier.

These and other aspects of the invention are detailed with particularity below.

DETAILED DESCRIPTION

Seemingly, dual-carrier UCI transmissions can be made to satisfy the BLER targets that are detailed in the background section above simply by having the UE transmit all its ACKs/

NACKs to one of the sites since there is a ready X2 interface between the macro eNB 14 and the pico eNB 12. But then the UCI that is relevant for the other site needs to be forwarded to that site via that X2 interface. In practice this X2 forwarding may lead to a delay of up to 20 ms, meaning fast radio resource management cannot be adopted. For this reason the various UCIs need to be separately signaled on the PCell and on the SCell, which the UE can do by switching between the two component carriers in a time division multiplexing manner to send the UCI of each cell.

Figure 2:
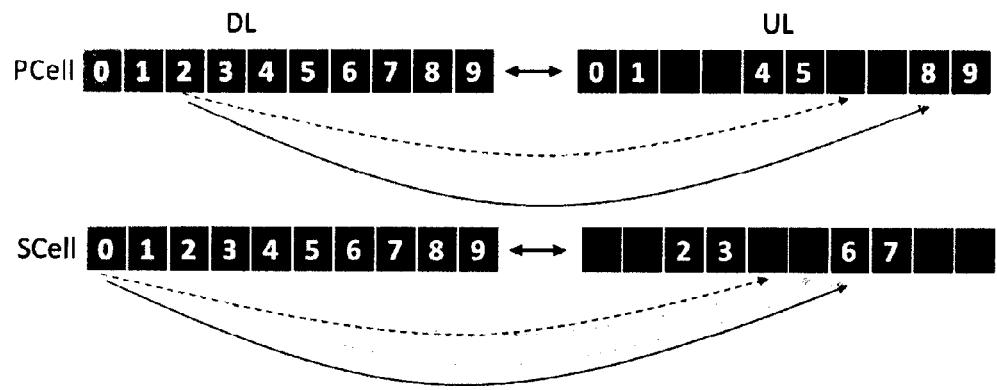
FIG. 2 illustrates mapping of DL to UL subframes on each of the PCell and on the SCell illustrating how the UE switches in the time domain between two UL carriers to transmit ACK/NACK for the corresponding downlink subframes.

Such a time division switchover is shown by example at FIG. 2, which bears an "X" in various subframes to indicate that no UCI transmission can be carried in that subframe. This is called single-carrier UCI transmission compared to dual-carrier UCI transmission. For single-carrier UCI transmission in the case of inter-site carrier aggregation, since ACK/NACK bits of the PCell and the SCell are transmitted by switching between two component carriers in the time domain, some UL subframes on one component carrier may not be used to transmit its UCI to avoid becoming a dual-carrier UCI transmission.

FIG. 2 gives examples of this. In the PCell, if the UE 10 is receiving a PDSCH in subframe 2 and 3 the UE would normally feedback the corresponding ACK/NACK respectively in uplink subframes 6 and 7 which are mapped by the dotted lines according to current LTE Releases 8, 9 and 10. However, for single-carrier UCI transmission, uplink subframe 6 and 7 cannot be occupied to transmit the UCI of the PCell, so the corresponding ACKs/NACKs of the PDSCHs in subframes 2 and 3 may be transmitted together in uplink subframe 8 which is mapped at FIG. 2 by the solid lines. Similarly for the SCell, the conventional mapping shown by dotted lines from PDSCHs in subframes 0 and 1 to their respective UCI (ACKs/NACKs) in UL subframes 4 and 5 cannot be used in this single-carrier UCI scenario and so those ACKs/NACKs will be sent together in UL subframe 6, mapped by the solid lines.

FIG. 2 shows that in each cell, the number of available UL subframes is smaller than the number of DL subframes from which they map so one UL subframe of each cell may carry ACK/NACK bits corresponding to multiple DL subframes of the same PCell or SCell. There is no more one-to-one mapping of subframes for UCI, which renders the subframe mapping scheme that is conventional for LTE Release 8/9/10 ineffective for inter-site carrier aggregation with single-carrier UCI as detailed for Release 11. Single carrier UCI allows a UE having only a single RF chain to operate with two (or more) carriers by switching between frequencies, one carrier/frequency on the PCell and another on the SCell.

Specifically, in LTE Releases 8/9/10, for frequency division duplexing FDD, the UE shall feedback ACK/NACK in uplink subframe n for a PDSCH, which is indicated by the corresponding PDCCH in subframe n−4, or for a PDCCH indicating downlink semi-persistent scheduling (SPS) release. This is one-to-one mapping. Also for FDD and normal HARQ operation, upon detection on a given serving cell of a PDCCH with downlink control information (DCI) format 0/4 and/or a PHICH transmission in subframe n intended for the UE, the UE shall adjust the corresponding PUSCH transmission in subframe n+4 according to the PDCCH and PHICH information. But there is no available solution in any release of conventional LTE for ACK/NACK feedback timing for inter-site carrier aggregation.

LTE Release 10 has a baseline assumption that there may be many more network nodes in a given area than previous releases. Such nodes may include conventional (macro) access nodes, pico/femto cells/home eNBs, remote radio heads and repeaters to name a few. To this end Release 10 introduced an interference mitigation mechanism termed enhanced inter-cell interference coordination eICIC whereby one cell coordinates with its neighbor cells to avoid interfering transmissions. The eICIC protocol in LTE Release 10 incorporates what is termed almost-blank subframes (ABSFs) during which one network node transmits only the common reference signals used for measurements (and in some cases also essential control information like synchronization, paging, or system information). ABSFs never include downlink unicast user data.

Figure 3:
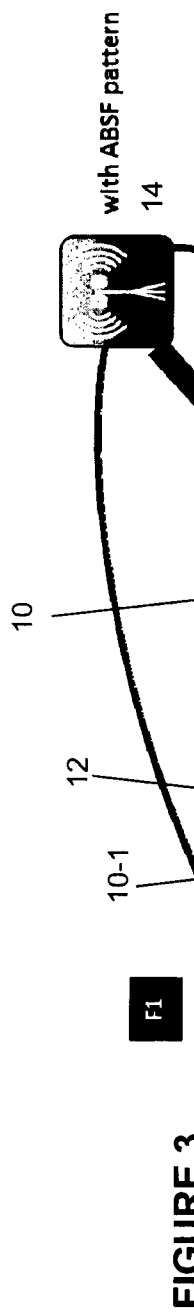
FIG. 3 is similar to FIG. 1 but in which there is an additional pico eNB operating on the PCell with the macro eNB and illustrating the macro eNB with an almost blank subframe pattern to mitigate interference on the PCell.

Consider FIG. 3, which adds another (LTE Release 10) pico cell 12-2 with an attached UE 10-2 alongside the macro 14 and (LTE Release 11) pico 12 eNBs from FIG. 1. For clarity, the macro eNB 14 will be termed the first, the Release 11 pico eNB 12 will be termed the second, and the Release 10 eNB 12-2 will be termed the third. While the examples below refer to the second eNB 12 as a pico eNB, it may also be implemented as a femto eNB or other access node having control over only a small geographic area (relative to the macro eNB). In FIG. 3 the first macro eNB 14 and the third pico eNB 12-2 are operating on frequency f1 (a first component carrier which is the PCell for the UE 10) while the second pico eNB 12 is operating on frequency f2 (a second component carrier which is the SCell for the UE 10). The first macro eNB 14 operates on f1 using an ABSF pattern and so does not transmit DL data in those ABSF subframes. During those ABSF subframes the third pico eNB 12-2 is relatively assured of minimal if any interference on f1 from the first macro eNB 14 and may transmit freely. This is time division duplex (TDD) eICIC but LTE Release 10 also adopts FDD eICIC. The first macro eNB 14 and the third pico eNB 12-2 of course are both aware of this ABSF pattern so those subframes may be exploited fully; conventionally the first macro eNB 14 will inform the third pico eNB 12-2 of the ABSF pattern via the X2 interface in LTE. The ABSFs transmitted by the first macro eNB 14 carry reference signals so that other UE's not getting a transmission from the third pico eNB 12-2 can measure their f1 channel with the first macro eNB 14, though measurements may also occur in other subframes.

But LTE Release 10 does not support inter-site carrier aggregation, so the eICIC does not contemplate FIG. 3 which has the second pico eNB 12 operating on a SCell but not co-located with the first macro eNB 14. See for example 3GPP TS 36.213 v10.2.0 which provides that the PCell and all SCells for a given UE are configured for the same eNB.

Figure 4:
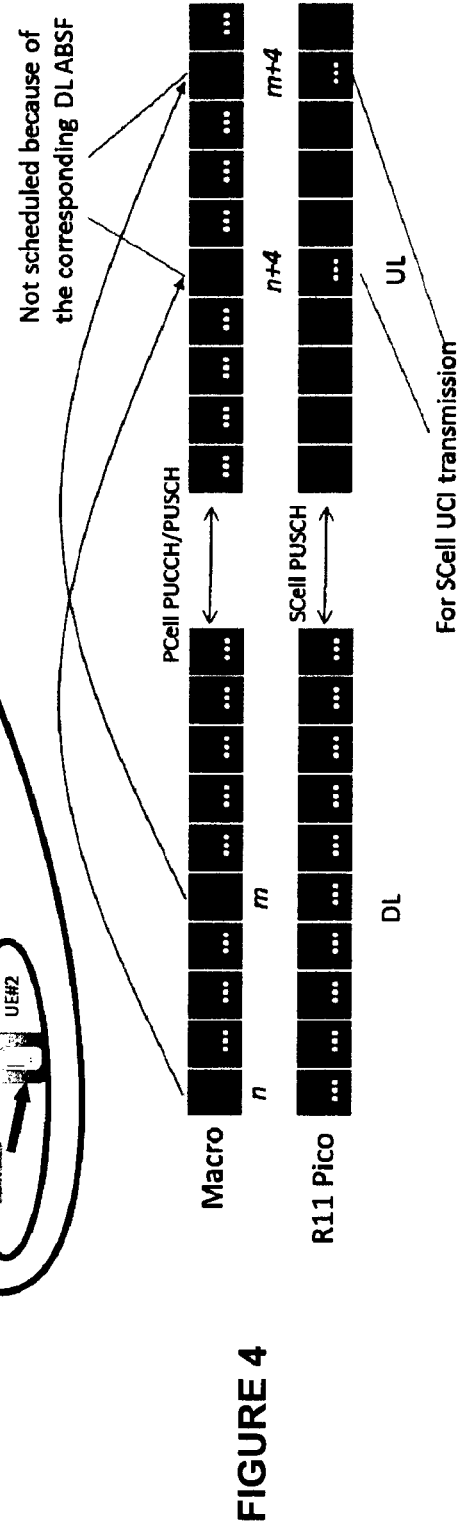
FIG. 4 illustrates a DL and an UL frame on the PCell and the SCell illustrating how the FIG. 3 UE can be scheduled in a restricted manner so that its UCI either coincides with or avoids those UL subframes which map from the DL almost blank subframes on the PCell.

FIG. 4 illustrates an exemplary ABSF pattern for the macro eNB 14. Using conventional subframe numbering 0-9 per frame (from left to right), the ABSFs are subframe #0 and #4, or as FIG. 4 more generically labels them subframes n and m are ABSFs for the first macro eNB 14 on the PCell. The conventional n+4 mapping to find the subframe in which the UE would send its ACK/NACK for these is then subframe #(n+4) and #(m+4) respectively, also on the PCell. According to these teachings, in those subframes which conventionally map from an ABSF the first macro eNB 14 will restrict its scheduling of the UE 10 attached to the second pico eNB 12 so that the UE will not be scheduled by the first macro eNB 14 to send any UCI in those subframes. In this regard scheduling refers not only to PDCCHs and PDSCHs but also the HARQ processes attached to them. For the first HARQ re-transmission this follows naturally since these subframes (n+4) and (m+4) map from the ABSFs n and m anyway. FIG. 4 illustrates this scheduling restriction on the PCell as x'd out UL subframes.

The UE 10 attached to the first macro eNB 14 on the PCell is also attached to the second pico eNB 12 on the SCell. On the SCell the second pico eNB 12 will schedule this UE 10 such that its UCI falls only on those UL subframes which are x'd out in the PCell. To effect this the first macro eNB 14 will need to coordinate its ABSF pattern which is operative on the PCell with the second pico eNB 12 which is operating on the SCell; this may be done in the LTE system over the X2 interface similar to the coordination done with the third pico eNB 12-2 which is operating on the same PCell as the first macro eNB 14.

This scheduling restriction need only be imposed for the case there is a UE 10 operating with two component carriers and inter-site carrier aggregation; once this UE 10 drops its SCell coverage (assuming there are no other multi-carrier inter-site carrier aggregation UEs remaining) there is no need for the first macro eNB 14 to continue restricting how it schedules this UE 10 to avoid the UL subframes that conventionally map from the first macro eNB's ABSFs. But note it is not required that the first macro eNB 14 abandon such scheduling restrictions for this same UE 10 on the remaining PCell.

So the new timing scheme for FIGS. 3-4 according to these teachings is as follows:

In the first macro eNB 14, according to HARQ feedback timing specified in 3GPP LTE Release 10, uplink subframe n+4 shall not be scheduled if downlink subframe n is configured as an ABSF, in order to mitigate the co-channel interference to the Release 10 third pico eNB 12-2 configured with the same carrier (PCell) as is the first macro eNB 14. The first macro eNB 14 also shares its ABSF pattern (via X2 interface) with the Release 10 third pico eNB 12-2 and also with the Release 11 second pico eNB 12 that supports inter-site carrier aggregation.

In case there is inter-site carrier aggregation, the UE 10 sends the UCI of the Release 11 second pico eNB 12 on the SCell in the UL subframes not scheduled by the first macro eNB 14 because the corresponding DL subframes in the first macro eNB 14 have been configured as ABSF.

The UE sends the UCI of the first macro eNB 14 on the PCell in the other UL subframes.

In FIG. 3 the first macro eNB 14 and the second pico eNB 12 are configured on different component carriers (PCell/f1 and SCell/f2). They are also configured as inter-site carrier aggregation for the UE 10 by RRC signaling which in this example sets the first macro eNB 14 as the PCell and the second pico eNB 12 as the SCell. Where there is inter-site carrier aggregation the ACK/NACK timing of the PCell and the SCell can be designed according to the ABSF pattern of the first macro eNB 14. In FIG. 3 DL subframe n, in of the first macro eNB 14 have been configured as ABSF subframes, so the corresponding UL subframe n+4, m+4 of the first macro eNB 14 shall not be scheduled because no control information is carried in ABSF subframes. This enables the Release 11 second pico eNB 12 to trigger the UE 10 to send its UCI on the UL subframes not scheduled by the first macro eNB 14. The UE 10 can then send the UCI of the Release 11 second pico eNB 12 on the SCell in UL subframes n+4 and m+4, while sending the UCI of the first macro eNB 14 on the PCell in other UL subframes (those other than subframes n+4 and m+4) within one HARQ period.

Comprehensively the procedure may be set forth in the following six steps. Firstly, the first macro eNB 14 semi-statically configures its ABSF pattern in order to mitigate the co-channel interference to the Release 10 third pico-eNB 12-2 which is configured with the same carrier (PCell). Secondly, the first macro eNB 14 sends the ABSF pattern to the Release 10 third pico eNB 12-2 and also to the Release 11 second pico eNB 12 via the X2 interface. At this point all of the network nodes have the relevant ABSF pattern which the macro eNB 14 is using. Thirdly, the first macro eNB 14 and the Release 11 second pico eNB 12 using the different carriers may be configured via RRC signaling as inter-site carrier aggregation with the first macro eNB 14 as the PCell and the Release 11 second pico eNB 12 as the SCell. This may occur simultaneous with the UE 10 becoming active on both the PCell and the SCell with the different eNBs 14, 12, and this is what triggers the network nodes to restrict their scheduling according to these teachings.

Fourth, the Release 11 second pico eNB 12 configures the SCell UCI transmission timing according to the PCell's ABSF pattern. Fifth, the UE 10 is triggered by the SCell to send UCI of an SCell transmission on the SCell PUSCH in the UL subframes which are not scheduled/restricted by the PCell, because the corresponding DL subframes have been configured as ABSF subframes. And finally sixth, the UE 10 sends the UCI of the PCell transmission it receives using PUCCH or PUSCH of the PCell in the other/non-restricted UL subframes.

The above examples are in the context of FDM based eICIC. As noted above, Release 10 of LTE utilizes eICIC in both TDD and FDD regimens, and similarly these teachings may be readily expanded to the TDD version of the LTE system in which the detailed TDD HARQ timing is determined by the TDD ABSF pattern and the TDD UL/DL subframe configurations of a given frame.

Implementing the above teachings result in the following technical effects to one extent or another, depending on the specific implementation. First, single-carrier UCI transmission in uplink will always be available, which guarantees better coverage than dual-carrier UCI transmissions. Second, implementing these teachings will have no adverse impact on the macro eNB's HARQ timing and ACK/NACK feedback scheme. Third, such implementation will have only a minimum impact on the Release 11/second pico eNB's HARQ timing. And finally, no radio resources are wasted if the PCell is configured with ABSF, which absent these teachings they would be because the subframes which map conventionally from the ABSFs are not used (on the PCell in the above examples).

While the above examples use the n+4 mapping of subframes, any mapping commonly understood by the various eNBs involved as well as by the UE 10 can be substituted without departing from these teachings and so the mapping may be stated more generally as n+x mapping, in which x may be any positive integer such as 4 or 6 as non-limiting examples. Rather than a pico eNodeB as in the above examples the second network access node may instead be a femto eNodeB or other similar small-cell access node without departing from these teachings. Further, the use of the LTE Release 11 system in the above examples is merely exemplary to show one particular practical implementation; these teachings may be similarly employed with any carrier aggregation system in which inter-site carrier aggregation is an option for a given UE.

Figure 5:
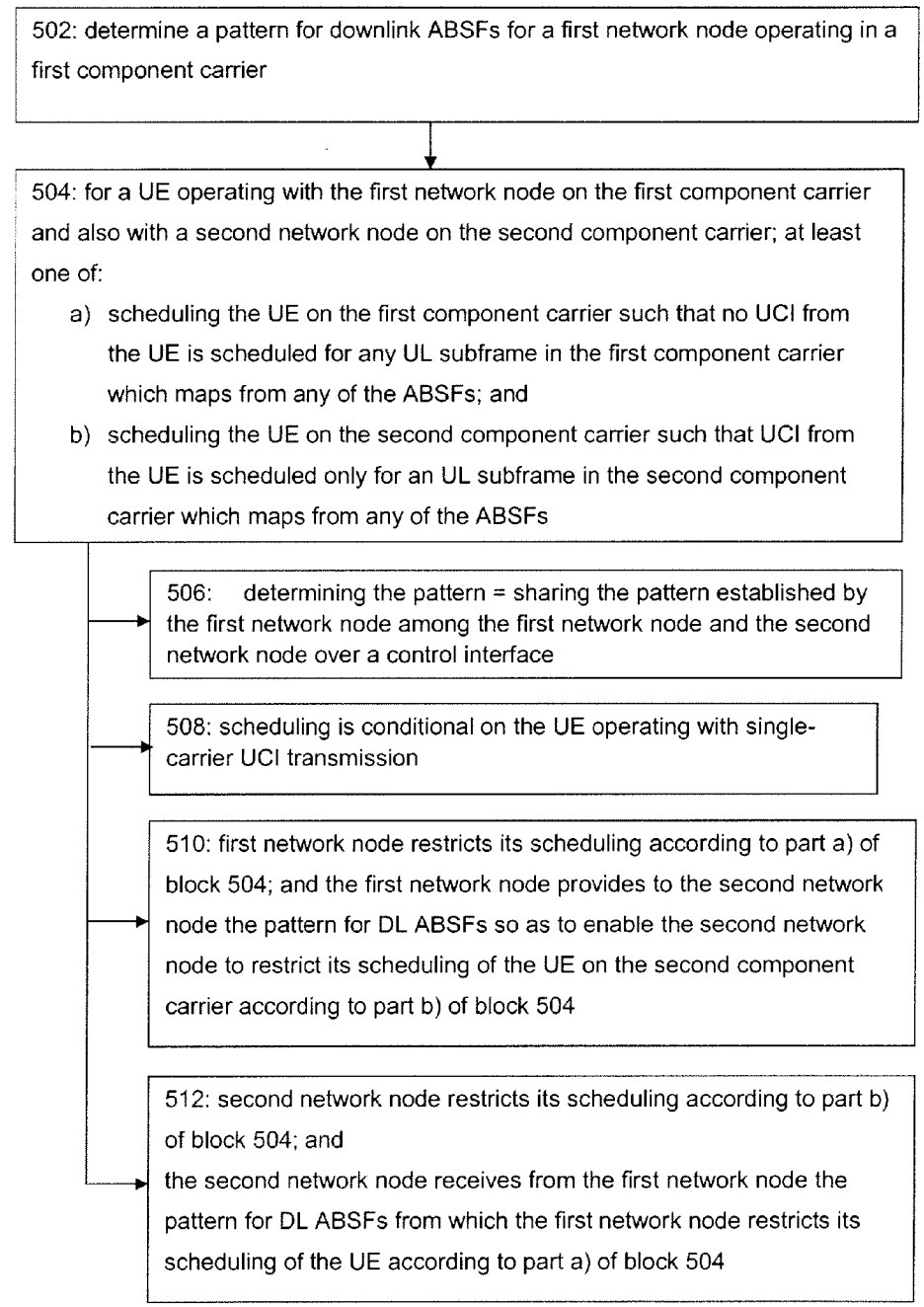
FIGS. 5-6 are flow diagrams illustrating a method, and actions taken by an apparatus, and the result of executing an embodied computer program from the perspective of the wireless network and the UE respectively, according to the exemplary embodiments of the invention.
Figure 6:
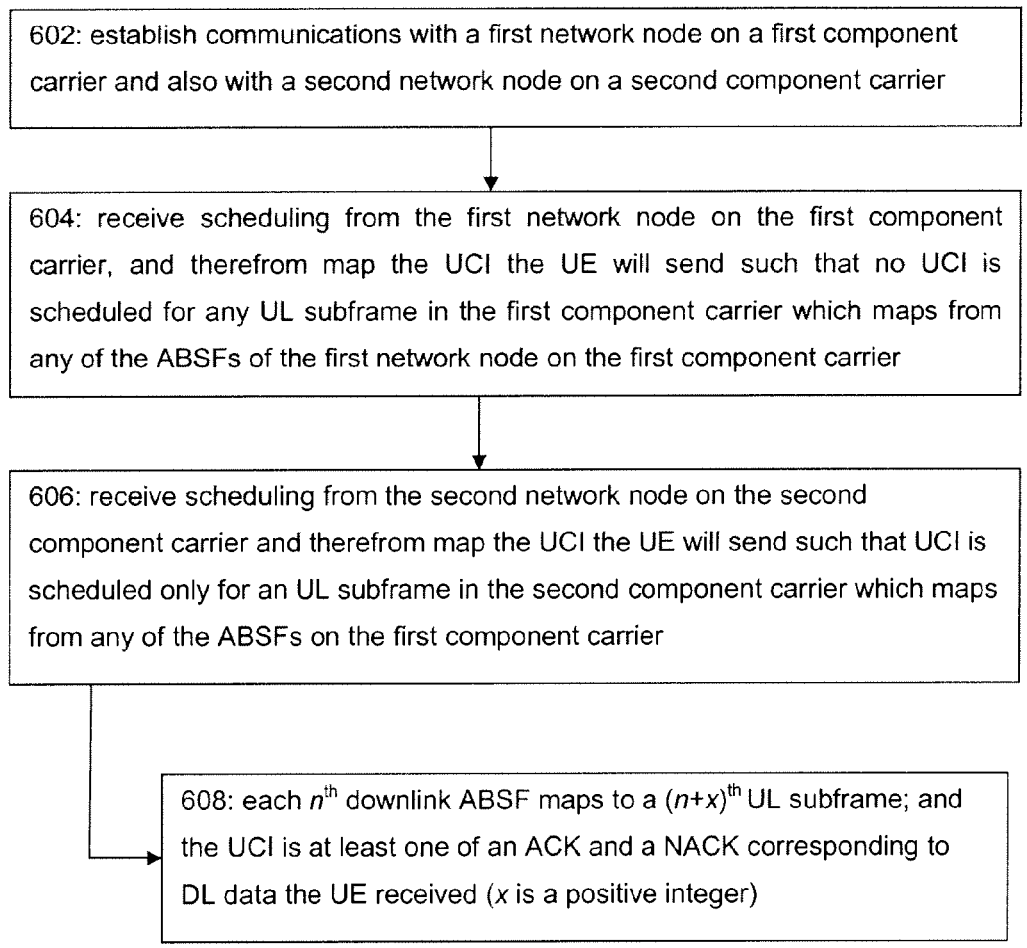

FIGS. 5-6 are flow diagrams illustrating for a specific embodiment those actions taken by either or both of the macro and pico/femto eNBs 14, 12 (FIG. 5), and by the UE 10 (FIG. 6). First consider FIG. 5 from the network nodes' perspective. At block 502 there is determined a pattern for downlink ABSFs for a first network node operating in a first component carrier. Block 504 is specific for a UE operating with the first network node on the first component carrier and also with a second network node on the second component carrier. Depending on which node 12, 14 is executing block 504, then at least one of: a) scheduling the UE on the first component carrier such that no UCI from the UE is scheduled for any UL subframe in the first component carrier which maps from any of the ABSFs; and b) scheduling the UE on the second component carrier such that UCI from the UE is scheduled only for an UL subframe in the second component carrier which maps from any of the ABSFs.

For the case in which block 504 is executed by the first macro eNB 14 of the above examples then it schedules the UE according to part a); if by the second pico/femto eNB 12 then it schedules the UE according to part b). As with the above examples, the pattern at block 502 for the downlink ABSFs is on the first component carrier; the mapping at block 504 is that each $n^{th}$ downlink ABSF maps to a $(n+x)^{th}$ UL subframe (where x is a positive integer); and the UCI of block 504 comprises at least one of an ACK and a NACK corresponding to data sent DL to the UE. In the above examples the first network node is the first macro eNodeB 14; the first component carrier is the PCell for the UE 10; the second network node is the second pico eNodeB 12 (or femto eNodeB); and the second component carrier comprises a SCell for the UE 10.

Other portions of FIG. 5 detail modifications to or implementation details for blocks 502 and 504; these other functional blocks may be implemented individually or in any of various combinations for specifying various particular embodiments. Block 506 details that determining the pattern from block 502 comprises sharing the pattern established by the first network node among the first network node and the second network node over a control interface. Block 508 conditions the scheduling of block 504 on the UE operating with single-carrier UCI.

Now, in the case that FIG. 5 is from the perspective of the first network node/first macro eNB 14, as above that first network node schedules according to part a) of block 504. But that first network node is not unaware of the restricted scheduling done by the second pico/femto eNB 12 since both are restricting their scheduling of this UE 10 according to a common plan. In this case and as shown at block 510 the first network node/first macro eNB 14 provides to the second network node/second pico or femto eNB 12 the pattern for downlink ABSFs so as to enable the second network node/second pico or femto eNB 12 to restrict scheduling of the user equipment on the second component carrier according to part b) of block 504.

In the case that FIG. 5 is from the perspective of the second network node/second pico or femto eNB 12, as above that second network node schedules according to part b) of block 504. Then according to the common plan of restricting their scheduling of this UE 10, block 512 shows the second network node/second pico or femto eNB 12 receiving from the first network node/first macro eNB 14 the pattern for DL ABSFs from which the first network node restricts its scheduling of the UE according to part a) of block 504.

Turning to FIG. 6 there is a flow diagram illustrating an exemplary method, and actions taken by the UE 10 according to the exemplary embodiments detailed above. At block 602 the UE 10 establishes communications with a first network node on a first component carrier and also with a second network node on a second component carrier. Then at block 604 the UE receives scheduling from the first network node on the first component carrier, and maps the UCI it will send therefrom such that no UCI is scheduled for any UL subframe in the first component carrier which maps from any of the ABSFs of the first network node on the first component carrier. Similarly at block 606 the UE receives scheduling from the second network node on the second component carrier and maps the UCI it will send therefrom such that UCI is scheduled only for an UL subframe in the second component carrier which maps from any of the ABSFs on the first component carrier. Block 604 corresponds to the scheduling which the UE 10 receives from the first macro eNB 14 in the above examples, and block 606 corresponds to the scheduling which the UE 10 receives from the second pico or femto eNB 12.

Block 608 summarizes the specific mapping used in the examples above, in that each $n^{th}$ downlink ABSF maps to a $(n+x)^{th}$ UL subframe (where x is a positive integer). Also in those examples the UCI was at least one of an ACK and a NACK corresponding to DL data the UE received.

Embodiments of the present invention as detailed at FIGS. 5-6 and in the examples above may be implemented in tangibly embodied software (such as a computer-readable medium bearing computer program code embodied therein for use with a computer, in which the computer program code has code for accomplishing some or all of the actions set forth at FIG. 5 or 6 as the case may be), hardware, application logic or a combination of software, hardware and application logic. In an exemplary embodiment, the application logic, software or an instruction set is maintained on any one of various conventional computer-readable media. The methods represented by FIGS. 5-6 may be performed via hardware elements, via tangibly embodied software executing on a processor, or via combination of both. A program of computer-readable instructions may be embodied on a computer readable memory such as for example any of the MEMs detailed below with respect to FIG. 7.

Figure 7:
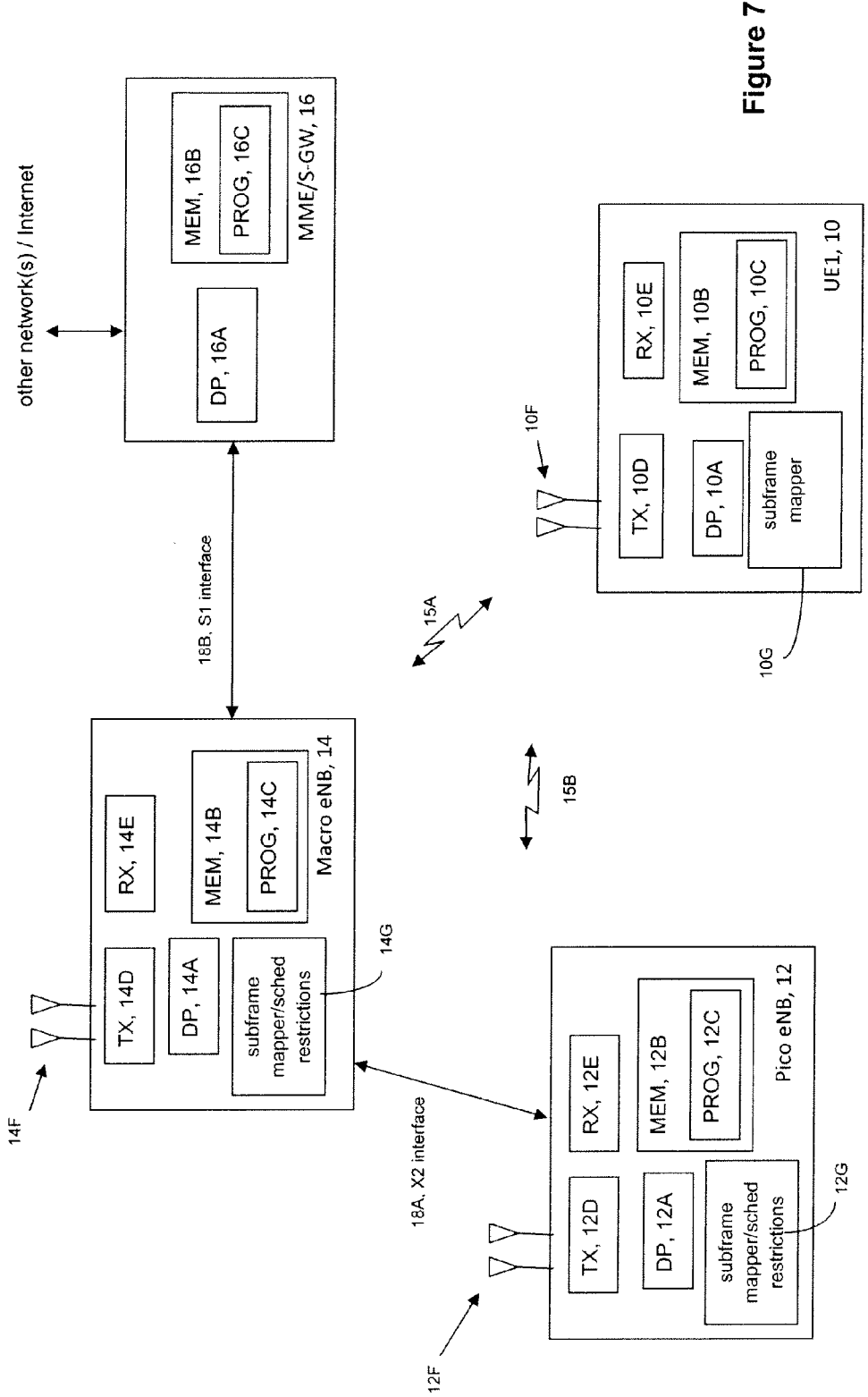
FIG. 7 is a schematic block diagram showing various electronic devices/apparatus suitable for implementing exemplary embodiments of the invention detailed herein.

Reference is now made to FIG. 7 for illustrating a simplified block diagram of various electronic devices and apparatus that are suitable for use in practicing the exemplary embodiments of this invention. In FIG. 7, a wireless network is adapted for communication over wireless links 15A, 15B with an apparatus, such as a mobile communication device which is referred to above as a UE 10, via a first network access node designated by example at FIG. 7 as a macro eNB 14 and also a second network access node designated by example as a pico eNB 12 for the case of an LTE or LTE-A network. There is further an X2 interface 18A between these eNBs 12, 14. The wireless network may include a network control element 16 that may be a mobility management entity (MME) having serving gateway (S-GW) functionality such as that known in the LTE system, and which provides connectivity with a further network such as a publicly switched telephone network and/or a data communications network (e.g., the Internet).

The UE 10 includes a controller, such as a computer or a data processor (DP) 10A, a computer-readable memory (MEM) 10B that tangibly stores a program of computer instructions (PROG) 10C, and at least one suitable radio frequency (RE) transmitter 10D and receiver 10E for bidirectional wireless communications with the eNBs 12, 14 via one or more antennas 10F. The UE 10 has functionality shown at subframe mapper 10G to map its UCI so as to, according to the specific examples above, avoid the ABSF mapping if the UCI is being sent on the PCell and to only coincide with the ABSF mapping if the UCI is being sent on the SCell.

The pico eNB 12 also includes a controller, such as a computer or a data processor (DP) 12A, a computer-readable memory (MEM) 12B that tangibly stores a program of computer instructions (PROG) 12C, and at least one suitable RF transmitter 12D and receiver 12E for communication with the UE 10 via one or more antennas 12F. The pico eNB 12 has functionality at subframe mapper 12G which it uses to restrict its scheduling on the SCell of the UE 10 according to the above teachings.

The macro eNB 14 also includes a controller, such as a computer or a data processor (DP) 14A, a computer-readable memory (MEM) 14B that tangibly stores a program of computer instructions (PROG) 14C, and at least one suitable RF transmitter 14D and receiver 14E for communication with the UE 10 via one or more antennas 14F. The macro eNB 14 has functionality at the subframe mapper 14G similar to that of the pico eNB 12 at block 12G. The macro eNB 14 is additionally coupled via a data/control path 18B (shown as an S1 interface) to the MME/S-GW 16.

The MME/S-GW 16 also includes a controller, such as a computer or a data processor (DP) 16A and a computer-readable memory (MEM) 16B that stores a program of computer instructions (PROG) 16C. The MME/S-GW 16 may be connected to additional networks such as the Internet.

The techniques herein may be considered as being implemented solely as computer program code embodied in a memory resident within the UE 10 or within either or both eNBs 12, 14 (e.g., as PROG 10C, 12C or 14C, respectively), or as a combination of embodied computer program code (executed by one or more processors) and various hardware, including memory locations, data processors, buffers, interfaces and the like, or entirely in hardware (such as in a very large scale integrated circuit). Additionally, the transmitters and receivers 10D/E, 12D/E and 14D/E may also be implemented using any type of wireless communications interface suitable to the local technical environment, for example, they may be implemented using individual transmitters, receivers, transceivers or a combination of such components.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 10B, 12B and 14B may be any type of computer-readable medium bearing computer program code that is suitable to the local technical environment and may be implemented using any suitable data storage technology, such as semiconductor based memory devices, flash memory, magnetic memory devices and systems, optical memory devices and systems, fixed memory and removable memory. The DPs 10A, 12A and 14A may be of any type suitable to the local technical environment, and may include one or more of general purpose computers, special purpose computers, microprocessors, digital signal processors (DSPs) and processors based on a multi-core processor architecture, as non-limiting examples.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus comprising:
at least one processor; and
at least one memory including computer program code, in which the at least one memory and the computer program code are configured, with the at least one processor, to cause the apparatus at least to:
determine a pattern for downlink almost blank subframes for a first network node operating in a first component carrier; and
for a user equipment operating with the first network node on the first component carrier and also with a second network node on the second component carrier, at least one of:
scheduling the user equipment on the first component carrier such that no uplink control information from the user equipment is scheduled for any uplink subframe in the first component carrier which maps from any of the almost blank subframes; and
scheduling the user equipment on the second component carrier such that uplink control information from the user equipment is scheduled only for an uplink subframe in the second component carrier which maps from any of the almost blank subframes; in which:
the pattern for the downlink almost blank subframes is on the first component carrier;
each $n^{th}$ downlink almost blank subframe maps to a $(n+x)^{th}$ uplink subframe, in which x is a positive integer; and
the uplink control information comprises at least one of an acknowledgement and a negative acknowledgement corresponding to data sent downlink to the user equipment.

2. The apparatus according to claim 1, in which determining the pattern comprises sharing the pattern established by the first network node among the first network node and the second network node over a control interface.

3. The apparatus according to claim 1, in which the at least one of scheduling is conditional on the user equipment operating with single-carrier transmission of uplink control information.

4. The apparatus according to claim 1, in which the apparatus comprises the first network node which is a macro eNodeB; the first component carrier comprises a primary cell for the user equipment; the second network node is a pico eNodeB or a femto eNodeB; and the second component carrier comprises a secondary cell for the user equipment.

5. The apparatus according to claim 4, in which the at least one of scheduling is restricting scheduling of the user equipment on the first component carrier such that no uplink control information from the user equipment is scheduled for any uplink subframe in the first component carrier which maps from any of the almost blank subframes;
in which the at least one memory and the computer program code are configured with the at least one processor to cause the apparatus further to:
provide to the second network node the pattern for downlink almost blank subframes so as to enable the second network node to restrict scheduling of the user equipment on the second component carrier such that uplink control information from the user equipment is scheduled only for an uplink subframe in the second component carrier which maps from any of the almost blank subframes.

6. The apparatus according to claim 1, in which the apparatus comprises the second network node which is a pico eNodeB or a femto eNodeB; the second component carrier comprises a secondary cell for the user equipment; the first network node is a macro eNodeB; and the first component carrier comprises a primary cell for the user equipment.

7. The apparatus according to claim 6, in which the at least one of scheduling is restricting scheduling of the user equipment on the second component carrier such that uplink control information from the user equipment is scheduled only for an uplink subframe in the second component carrier which maps from any of the almost blank subframes;

in which the at least one memory and the computer program code are configured with the at least one processor to cause the apparatus further to:
receive from the first network node the pattern for downlink almost blank subframes from which the first network node restricts scheduling of the user equipment on the first component carrier such that no uplink control information from the user equipment is scheduled for any uplink subframe in the first component carrier which maps from any of the almost blank subframes.

8. A method comprising:
determining a pattern for downlink almost blank subframes for a first network node operating in a first component carrier; and
for a user equipment operating with the first network node on the first component carrier and also with a second network node on the second component carrier, at least one of:
scheduling the user equipment on the first component carrier such that no uplink control information from the user equipment is scheduled for any uplink subframe in the first component carrier which maps from any of the almost blank subframes; and
scheduling the user equipment on the second component carrier such that uplink control information from the user equipment is scheduled only for an uplink subframe in the second component carrier which maps from any of the almost blank subframes; in which:
the pattern for the downlink almost blank subframes is on the first component carrier;
each $n^{th}$ downlink almost blank subframe maps to a $(n+x)^{th}$ uplink subframe, in which x is a positive integer; and
the uplink control information comprises at least one of acknowledgements and negative acknowledgements corresponding to data sent downlink to the user equipment.

9. The method according to claim 8, in which method is executed by the first network node which is a macro eNodeB; the first component carrier comprises a primary cell for the user equipment; the second network node is a pico eNodeB or a femto eNodeB; and the second component carrier comprises a secondary cell for the user equipment.

10. The method according to claim 9, in which the at least one of scheduling is restricting scheduling of the user equipment on the first component carrier such that no uplink control information from the user equipment is scheduled for any uplink subframe in the first component carrier which maps from any of the almost blank subframes;

in which the method further comprises:
providing to the second network node the pattern for downlink almost blank subframes so as to enable the second network node to restrict scheduling of the user equipment on the second component carrier such that uplink control information from the user equipment is scheduled only for an uplink subframe in the second component carrier which maps from any of the almost blank subframes.

11. The method according to any claim 8, in which the method is executed by the second network node which is a pico eNodeB or a femto eNodeB; the second component carrier comprises a secondary cell for the user equipment; the first network node is a macro eNodeB; the first component carrier comprises a primary cell for the user equipment; and the at least one of scheduling is restricting scheduling of the user equipment on the second component carrier such that uplink control information from the user equipment is scheduled only for an uplink subframe in the second component carrier which maps from any of the almost blank subframes.

12. A computer-readable memory tangibly storing computer program code for use with a computer, the computer program code comprising:
code for determining a pattern for downlink almost blank subframes for a first network node operating in a first component carrier; and
for a user equipment operating with the first network node on the first component carrier and also with a second network node on the second component carrier, at least one of:
code for scheduling the user equipment on the first component carrier such that no uplink control information from the user equipment is scheduled for any uplink subframe in the first component carrier which maps from any of the almost blank subframes; and
code for scheduling the user equipment on the second component carrier such that uplink control information from the user equipment is scheduled only for an uplink subframe in the second component carrier which maps from any of the almost blank subframes;
in which:
the pattern for the downlink almost blank subframes is on the first component carrier;
each $n^{th}$ downlink almost blank subframe maps to a $(n+x)^{th}$ uplink subframe, in which x is a positive integer; and
the uplink control information comprises at least one of acknowledgements and negative acknowledgements corresponding to data sent downlink to the user equipment.

13. An apparatus comprising:
at least one processor; and
at least one memory containing computer program code, in which the at least one memory and the computer program code are configured, with the at least one processor, to cause the apparatus at least to:
establish communications with a first network node on a first component carrier and also with a second network node on a second component carrier;
receive scheduling from the first network node on the first component carrier and map uplink control information therefrom such that no uplink control information is scheduled for any uplink subframe in the first component carrier which maps from any downlink almost blank subframe of the first network node on the first component carrier; and
receive scheduling from the second network node on the second component carrier and map uplink control information therefrom such that uplink control information is scheduled only for an uplink subframe in the second component carrier which maps from any of the downlink almost blank subframes on the first component carrier;
in which
each $n^{th}$ downlink almost blank subframe maps to a $(n+x)^{th}$ uplink subframe, in which x is a positive integer; and
the uplink control information comprises at least one of an acknowledgement and a negative acknowledgement corresponding to downlink data.

14. The apparatus according to claim 13, in which the apparatus comprises a user equipment operating with single-carrier transmission of uplink control information.

15. A method comprising:
- establishing communications with a first network node on a first component carrier and also with a second network node on a second component carrier;
- receiving scheduling from the first network node on the first component carrier and mapping uplink control information therefrom such that no uplink control information is scheduled for any uplink subframe in the first component carrier which maps from any downlink almost blank subframe of the first network node on the first component carrier; and
- receiving scheduling from the second network node on the second component carrier and mapping uplink control information therefrom such that uplink control information is scheduled only for an uplink subframe in the second component carrier which maps from any of the downlink almost blank subframes on the first component carrier; in which
- each $n^{th}$ downlink almost blank subframe maps to a $(n+x)^{th}$ uplink subframe, in which x is a positive integer; and
- the uplink control information comprises at least one of an acknowledgement and a negative acknowledgement corresponding to downlink data.

16. A computer-readable memory tangibly storing computer program code for use with a computer, the computer program code comprising:
- code for establishing communications with a first network node on a first component carrier and also with a second network node on a second component carrier;
- code for receiving scheduling from the first network node on the first component carrier and mapping uplink control information therefrom such that no uplink control information is scheduled for any uplink subframe in the first component carrier which maps from any downlink almost blank subframe of the first network node on the first component carrier; and
- code for receiving scheduling from the second network node on the second component carrier and mapping uplink control information therefrom such that uplink control information is scheduled only for an uplink subframe in the second component carrier which maps from any of the downlink almost blank subframes on the first component carrier; in which
- each $n^{th}$ downlink almost blank subframe maps to a $(n+x)^{th}$ uplink subframe, in which x is a positive integer; and
- the uplink control information comprises at least one of an acknowledgement and a negative acknowledgement corresponding to downlink data.

* * * * *